(12) United States Patent
Deiss

(10) Patent No.: US 9,296,150 B2
(45) Date of Patent: Mar. 29, 2016

(54) METHOD FOR EQUIPPING A COMPONENT WITH A SEALING TAPE

(71) Applicant: ISO-Chemie GmbH, Aalen (DE)

(72) Inventor: Martin Deiss, Abtsgmuend (DE)

(73) Assignee: ISO-CHEMIE GMBH, Aalen (DE)

( * ) Notice: Subject to any disclaimer, the term of this patent is extended or adjusted under 35 U.S.C. 154(b) by 0 days.

(21) Appl. No.: 14/225,863

(22) Filed: Mar. 26, 2014

(65) Prior Publication Data

US 2014/0202624 A1    Jul. 24, 2014

Related U.S. Application Data

(62) Division of application No. 12/964,362, filed on Dec. 9, 2010.

(30) Foreign Application Priority Data

Dec. 11, 2009 (EP) ..................................... 09178897
Dec. 11, 2009 (EP) ..................................... 09178899
Mar. 24, 2010 (EP) ..................................... 10157518

(51) Int. Cl.
*E04B 1/62* (2006.01)
*E04B 1/68* (2006.01)
*B29C 53/04* (2006.01)
*E06B 1/62* (2006.01)

(52) U.S. Cl.
CPC . *B29C 53/04* (2013.01); *E04B 1/68* (2013.01); *E04B 1/6812* (2013.01); *E06B 1/62* (2013.01); *E06B 2001/626* (2013.01); *Y10T 156/101* (2015.01); *Y10T 156/1011* (2015.01); *Y10T 156/1051* (2015.01); *Y10T 428/233* (2015.01); *Y10T 428/24008* (2015.01); *Y10T 428/24504* (2015.01); *Y10T 428/24983* (2015.01); *Y10T 428/249953* (2015.04); *Y10T 428/249983* (2015.04)

(58) Field of Classification Search
None
See application file for complete search history.

(56) References Cited

U.S. PATENT DOCUMENTS 4,204,373 A * 5/1980 Davidson ..................... 52/204.1
2005/0159496 A1  7/2005 Bambara et al.

FOREIGN PATENT DOCUMENTS

| DE | 102008025019 A1 | 10/2009 |
| EP | 1131525 B1 | 3/2004 |
| EP | 1811111 A2 | 7/2007 |
| WO | WO9845565 A1 | 10/1998 |
| WO | WO 9845565 A1 * | 10/1998 |
| WO | WO2005106176 A1 | 11/2005 |

OTHER PUBLICATIONS

Daniel et al., Sealing Strip, Nov. 10, 2005, machine translation of WO2005106176.

* cited by examiner

*Primary Examiner* — Barbara J Musser
(74) *Attorney, Agent, or Firm* — Jansson Munger McKinley & Kirby Ltd.

(57) ABSTRACT

The method for equipping a building component with a sealing tape includes providing a building component which has two profile channels open in an upward direction and providing a sealing tape comprising an elastically recoverable foam strip and a stiff strip-shaped element, which comprises a first side section and a second side section and includes two predetermined fold points. The first side section and the second side section of the stiff strip-shaped element are bent downward in opposite directions at the two predetermined fold points, and the bent-over first and second side sections are then introduced into the two profile channels where they clamp themselves in place.

14 Claims, 7 Drawing Sheets

METHOD FOR EQUIPPING A COMPONENT WITH A SEALING TAPE

RELATED APPLICATIONS

This application is a divisional of pending U.S. patent application Ser. No. 12/964,362, filed Dec. 9, 2010. The entire contents of such application is incorporated herein by reference. This application also claims priority based on European patent applications EP 09 178 897.6, EP 09 178 899.2, filed Dec. 11, 2009, and European patent application EP 10 157 518.1, filed Mar. 24, 2010.

FIELD OF THE INVENTION

The invention pertains to a method for equipping a component with a sealing tape.

BACKGROUND OF THE INVENTION

A precompressed sealing tape, which consists of an elastically recoverable foam strip of rectangular cross section, which, when in the compressed state, is completely enclosed by a wrapper formed by a plastic sheet, is known from EP 1 131 525 B1. To hold the foam strip in the wrapper, the strip is adhered along its bottom surface to the wrapper, and the wrapper for its own part can be adhered along its bottom surface to a frame profile by separate adhesive means such as double-sided adhesive tape.

Sealing tapes of this type are adhered to the frame profile to be sealed, and after the frame profile has been installed in an opening in the wall of the building, the wrapper is torn open, so that the foam strip can return elastically to its original shape and thus seal off the frame profile against the building wall.

U.S. Pat. No. 4,204,373 describes a sealing tape which consists of a flat strip, which can be adhered to a frame profile, and a foam strip arranged on top of that. The foam strip is covered by a sheet of paper or plastic, which is adhered to the flat strip and holds the foam strip in the compressed state. Along the edge of the covering sheet are rip cords, with the help of which the sheet can be torn open after the frame profile provided with the sealing tape has been installed in the building.

In the case of these known sealing tapes, however, it is a disadvantage that they can be adhered only to flat frames. It is often desirable, however, to fasten sealing tapes directly to window frame profiles which comprise outward-projecting, longitudinal profile strips.

For an application of this type, DE 10 2008 025 019 A1 discloses a sealing tape which can be held in place between the angled edges of two edge profile strips of a window frame by introducing a stiff layer, on which the flexible foam is arranged, into the intermediate space between the edge profile strips, where it is prevented from slipping out by the angled edges.

This design suffers from the disadvantage that it can be used only for a specific type of frame profile with precisely two profile strips extending down the sides, whereas other types of frame profiles with several profile strips cannot be used. In addition, the foam extends inward from the stiff layer toward the frame, so that, in order to achieve the desired sealing of the intermediate space between the frame profile and the masonry wall, the stiff layer has to be destroyed.

SUMMARY OF THE INVENTION

It is an object of the present invention to provide a simple method for attaching a sealing tape to a frame profile.

In an aspect of the invention, sealing tape comprises an elastically recoverable foam strip and a strip-like or strip-shape element, which is arranged underneath the foam strip. The strip-like element comprises higher flexural strength than the foam strip. The sealing tape can be fastened to the frame component to be sealed in an especially reliable and simple manner by providing the strip-like element with two predetermined fold points, so that two side sections of the strip-like element can be bent in opposite directions, i.e., toward each other, one counterclockwise, the other clockwise, at the two predetermined fold points. As a result, it becomes possible for both sides of the strip-like element and thus of the sealing tape to be securely clamped in place in the component to be sealed, wherein the effort of the strip-like element to return to its original state ensures that both sides are securely clamped in the corresponding profile channels of the frame component.

The method for equipping a component with sealing tape comprises the following steps:
  providing a component with at least one profile channel open in an upward direction;
  providing a sealing tape with a stiff strip-like element, which comprises two predetermined fold points;
  bending two side sections of the strip-like element downward at the two predetermined fold points; and
  introducing the two bent-over side sections into the two profile channels.

With this method, a component can be equipped with the sealing tape with only a few hand movements and in a short time to achieve a superior sealing effect against the masonry wall. The double-sided attachment creates a secure and permanent connection between the component and the sealing tape.

It is advantageous that the strip-like element is formed out of stiff foam. The advantages which can thus be obtained are that the bent-over side section exerts an elastic recovery force, which ensures that the side section is clamped securely in the profile channel, and that stiff foam offers superior sealing values.

In a preferred embodiment, the foam strip is permanently bonded to the strip-like element. As a result, a secure connection is produced between the two layers, and the layers are prevented from sliding over each other.

It is advantageous for the strip-like element to comprise a flexural strength of more than 200 kPa, and preferably of more than 250 kPa. In another preferred embodiment, the strip-like element comprises a flexural strength of more than 300 kPa, and preferably of more than 400 kPa. In an especially preferred embodiment, the strip-like element comprises a flexural strength of more than 500 kPa, preferably of more than 1,000 kPa, and even more preferably of more than 2,000 kPa.

It is advantageous for each fold point to be formed by a downward-facing recess. This makes it easier to bend the side section of the stiff layer downward, and at the same time an upward-directed restoring force remains present in the bent-over side section.

In a preferred embodiment, the recess is designed to widen out in the downward direction. This ensures that the side section can be bent over very easily, whereas the strip-like element still forms an integral, preferably closed unit even after the side section has been bent over.

Preferably the side section comprises a latching means at its edge. This increases the strength with which the bent-over side section is held in the profile channel of the frame component, and the likelihood that the bent-over side section will slide out of the profile channel unintentionally is reduced even more.

It is also possible to provide the side section with adhesive properties, so that the side section can be fastened permanently to the frame component to be sealed.

The foam strip is preferably enclosed at least partially by a sheet-like wrapper and held in a precompressed state by it. In this way, it is possible to store and to transport the sealing tape easily and to bring it into its functional state simply by opening the wrapper after the tape has been attached to the frame component to be sealed.

In one embodiment, the sealing tape can be wound up into a roll, which makes it much easier to transport and to store the sealing tape.

BRIEF DESCRIPTION OF THE DRAWINGS

The invention is explained in greater detail below with reference to the embodiments shown in the drawings.

DETAILED DESCRIPTION OF THE INVENTION

Figure 1:
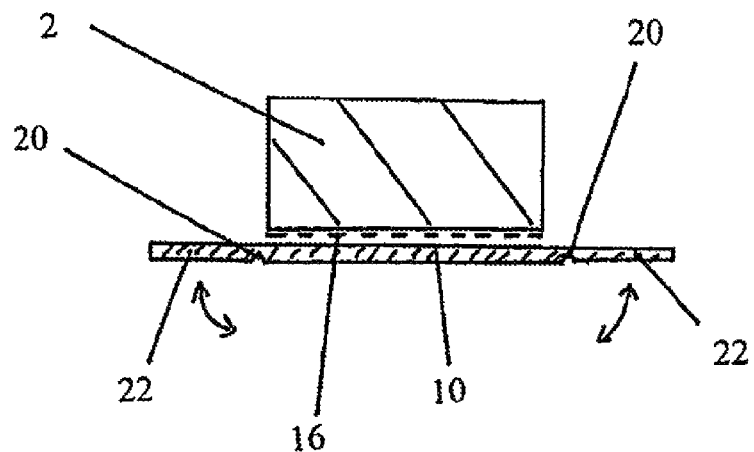
FIG. 1 is a schematic cross-sectional view of a first embodiment of the sealing tape according to the invention.

In some cases, the foam strips, wrappers, adhesive tapes, strip-like elements, etc., are shown a certain distance away from each other in the drawings so that the individual elements which form the sealing tape can be distinguished clearly from each other. In reality, these elements rest directly against each other.

FIGS. 1-4 show a foam strip 2, which, in the example illustrated here, has a rectangular cross section. Foam strip 2 can be formed out of any desired open-cell or closed-cell flexible foam such as from polyurethane foam or polyethylene foam, and can be impregnated to delay its recovery after compression. A multilayer arrangement of several different foam materials laminated to each other is also possible, as is the arrangement of an impregnated foam layer on or next to a non-impregnated foam layer. In particular, various foam layers can be arranged directly adjacent to each other in the transverse direction so as to give the sealing tape a certain air permeability in the inner area and a different one in the outer area, for example, or to create a vapor diffusion gradient. It is also possible to arrange two or more foam strips 2 on the strip-like element 10 in such a way that they are not directly adjacent to each other.

Foam strip 2 extends farther in its longitudinal direction than in its transverse direction, and, in the embodiment shown here, it comprises two lateral surfaces 6 and two transverse surfaces 8, 9 (top 8 and bottom 9), which connect two lateral surfaces 6 together.

In certain preferred embodiments (FIGS. 3, 4a, and 4b), foam strip 2 is at least partially enclosed by a sheet-like wrapper 4 and is held by it in a precompressed state.

The material of wrapper 4 can be a sheet material, a mesh fabric, paper, or some other material which is suitable for the purpose described. Laminated sheets consisting of a plastic sheet laminated to a support material (e.g., a nonwoven) can also be used; fiber-reinforced sheets are also possible. All of these materials are described by the expression "sheet-like". Combinations of such materials are also possible. A thermoplastic sheet, however, or a heat-shrink sheet, which contracts under the effect of heat, is preferred.

A strip-like element 10, which has a certain flexural strength in the transverse direction, is arranged in the area of the bottom surface 9 of foam strip 2. The flexural strength should be high enough that strip-like element 10 can absorb at least some of the force which originates from the tendency of foam strip 2 to expand (a force which otherwise would cause flexible wrapper 4 to deform into a tube with an oval or possibly even a round cross section) without strip-like element 10 itself undergoing any significant amount of deformation. Conversely, strip-like element 10 should still have a certain elastic recovery force even after it has been intentionally bent.

A foam which comprises greater, preferably much greater flexural strength than foam strip 2 is preferred as the material of strip-like element 10. Further details are given below. In other embodiments, furthermore, cardboard, for example, can be used, but any other suitable stiff material such as rigid plastic is also possible.

In certain embodiments, the strip-like element 10 should be flexible in the longitudinal direction to such an extent that the sealing tape can be wound up into a roll. In the example shown here, doubled-sided adhesive tape 16 is arranged between the bottom surface 9 of foam strip 2 and strip-like element 10 and thus joins the two elements tightly together. The tight connection between foam strip 2 and strip-like element 10 can also be achieved by other means such as by thermoplastic lamination. In some embodiments, the tight connection between foam strip 2 and strip-like element 10 can, under certain conditions, be omitted.

As can be seen from FIGS. 2, 4a, 4b, 6, 8, 10, and 12, the sealing tape is attached to a component 12, preferably a frame profile such as the frame profile of a window. These types of frame profiles consist, for example, of plastic or metal and exist in a large number of forms, wherein most of them comprise at least one, usually two, profile channels 14, which are defined by profile strips 18, which project from the base body of the component and which are usually angled. Profile channels 14 can also be formed by longitudinal grooving, which can also be quite shallow. The basic purpose of profile channels 14 is to allow frame profiles to be strung together in rows, but they also form edges, which must then be sealed off effectively. It is this sealing to which the present invention pertains.

So that the sealing tape can be attached easily and permanently to component 12, strip-like element 10 comprises at least one, preferably two, predetermined fold points 20. Predetermined fold points 20 make it possible to bend down one or possibly two side sections 22 of strip-like element 10. In cases where two predetermined fold points 20 and two side sections 22 to be bent are provided, these two side sections 22 are bent downward in opposite directions. In the preferred embodiments shown here, predetermined fold point 20 is located in each case near the edge of strip-like element 10, and the associated side section 22 forms the edge area of strip-like element 10.

Figure 5:
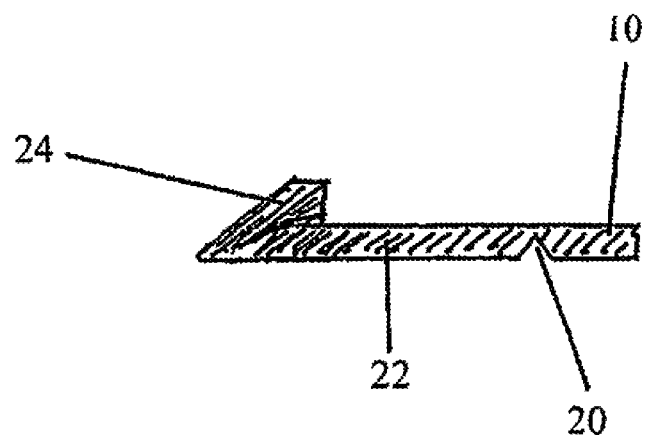
FIG. 5 is an enlarged schematic cross-sectional view of part of a third embodiment of the sealing tape according to the invention.
Figure 7:
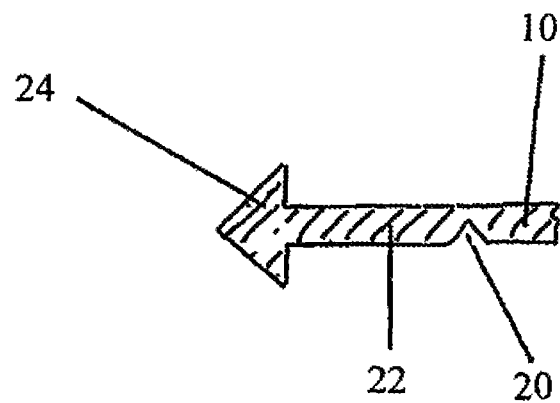
FIG. 7 is an enlarged schematic cross-sectional view of part of a fourth embodiment of the sealing tape according to the invention.
Figure 9:
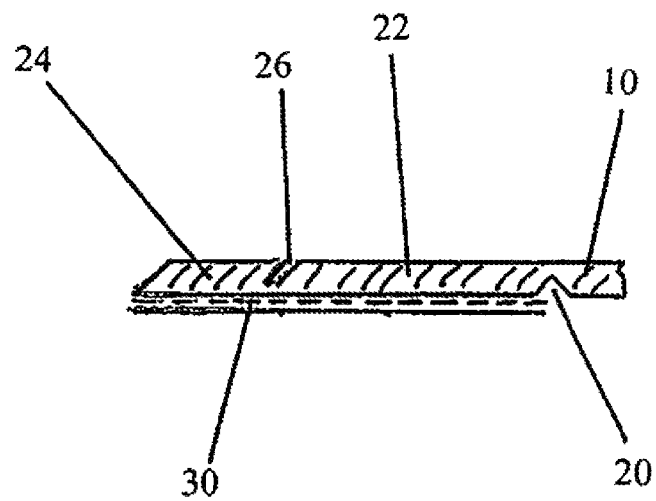
FIG. 9 is an enlarged schematic cross-sectional view of part of a fifth embodiment of the sealing tape according to the invention.

As can be seen especially clearly in FIGS. 5, 7, and 9, predetermined fold point 20 is preferably formed by a downward-directed recess in strip-like element 10. This recess preferably expands in the downward direction. In the preferred embodiment shown, the side walls, which form the boundaries of the recess, are at an angle to each other, and the cross sections of the recess thus forms an upside-down "V". Because of the material remaining in the web above the recess, side section 22 tries to move back upward. It can also be useful for side section 22 to displace material when it is being bent downward, because this increases the strength of the recovery force. The effort exerted by the side section to return can therefore be adjusted in a material-dependent manner by changing the shape and size of the recess. By means of this hinge mechanism, it is possible for side section 22 of strip-like element 10 to clamp itself in profile channel 14 of component 12.

In addition to the form of the recess shown here, it is also possible to produce a cut or to mill a groove in one side of the strip or to produce a thin area by thermoforming or to obtain a predetermined fold point 20 by some other method of weakening the material.

Figure 2:
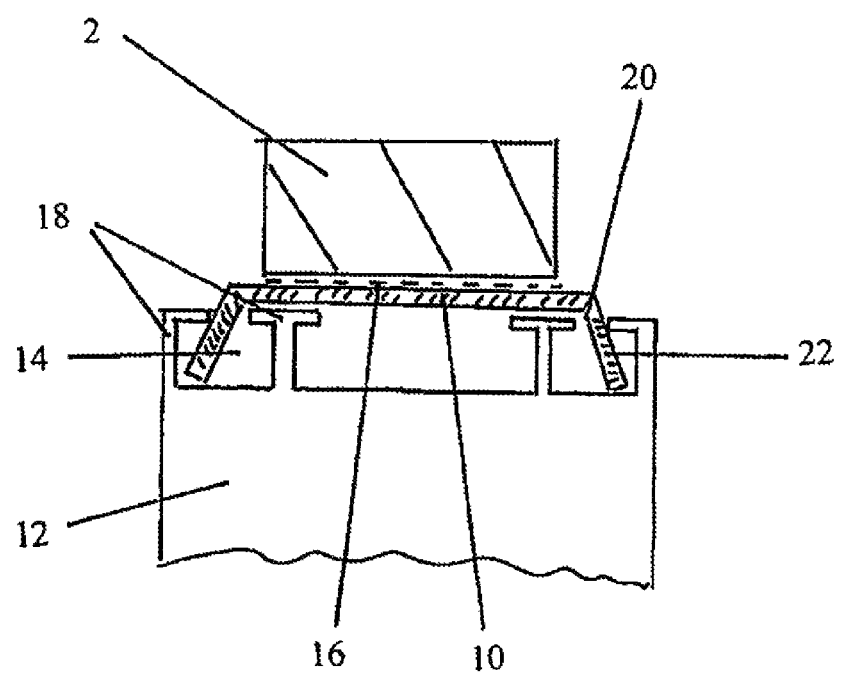
FIG. 2 is a schematic cross-sectional view of the first embodiment of the sealing tape of FIG. 1 after it has been attached to a component.
Figure 4A:
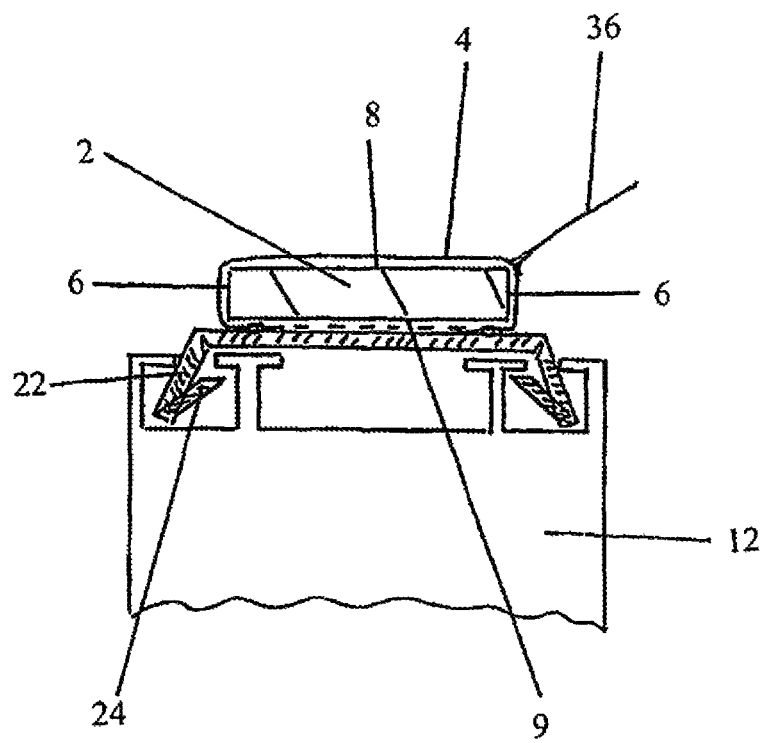
FIGS. 4a and 4b are schematic cross-sectional views of two variants of the second embodiment of the sealing tape after it has been attached to a component.
Figure 4B:
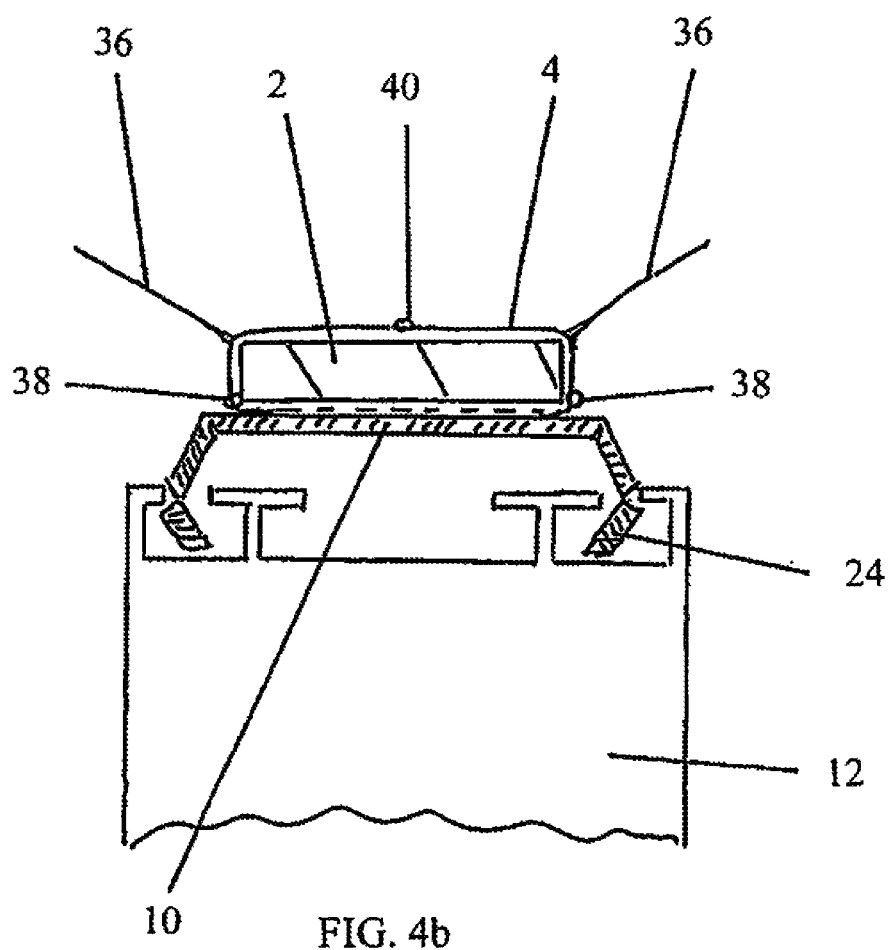

As shown in FIGS. 2, 4a, and 4b, the sealing tape in all of the embodiments is preferably attached to component 12 in mirror-image fashion along the two opposite edge areas of strip-like element 10. It is also conceivable, however, that only one edge area of strip-like element 10 is clamped or attached to a component 12, whereas the remaining part of strip-like element 10 is merely adhered to the component or attached to it in some other way, or, in the extreme case, simply allowed to rest on it.

Figure 3:
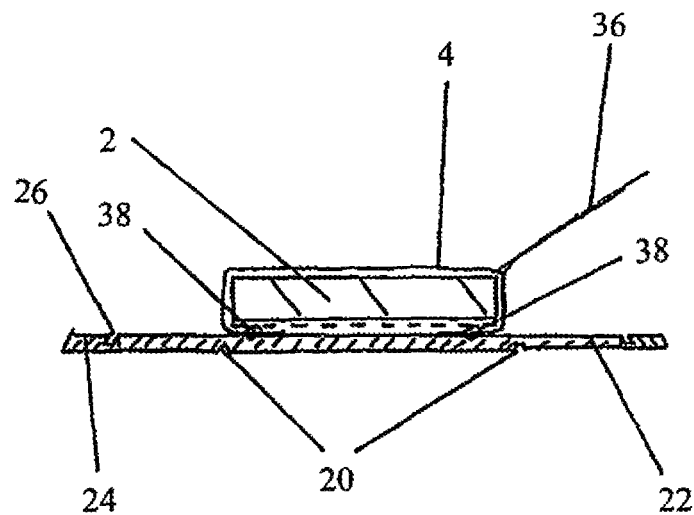
FIG. 3 is a schematic cross-sectional view of a second embodiment of the precompressed sealing tape according to the invention.

In the embodiment shown in FIGS. 3, 4a, and 4b, in addition to the previously mentioned effort of side sections 22 to return to their horizontal position as a result of the partially elastic properties of strip-like element 10, there is an additional supporting force, which also exerts an upward-directed force component on side sections 22. This lies in the effort of foam strip 2 held in wrapper 4 to expand. Because of its tight connection to strip-like element 10, foam strip held 2 in wrapper 4 tries to pull wrapper 4 in the direction of an oval by its inherent force of expansion and thus generates an upward-directed force component in the areas of strip-like element 10 lying just inside predetermined fold points 20. This, in combination with the partially elastic properties of strip-like element 10, which is in itself stiff, reinforces the clamping function of side section 22 in angled outer profile strips 18.

Many different forms of components 12, of their associated profile strips 18, and of profile channels 14 thus formed are known. The two variants shown in FIGS. 3, 4a, and 4b are especially effective in making it possible for the sealing tape according to the invention to be applied as flexibly as possible to profile channels 14 of different designs. Here a latching means 24 is provided in the area of the outer edge of side section 22; in the present case, this latching means is formed by an additional flexible extension of strip-like element 10. This extension can be connected to the rest of side section 22 by another predetermined fold point 26; it is bent over inside profile channel 14 in correspondence with the prevailing geometry and thus locks itself between profile strips 18. FIGS. 4a and 4b show two possible types of locking actions. Predetermined fold point 26 separating latching means 24 from the rest of side section 22 is preferably designed as a simple cut proceeding from above, and the outside edge of latching means 24 can comprise a bevel.

Figure 6:
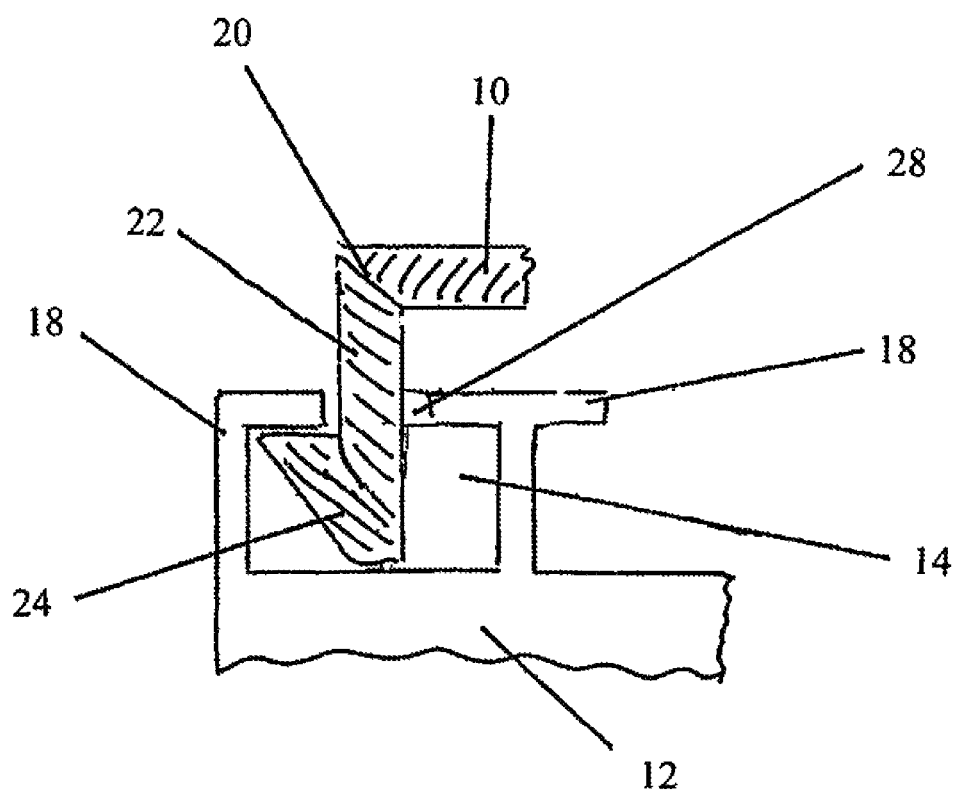
FIG. 6 is an enlarged schematic cross-sectional view of part of the third embodiment of the sealing tape after it has been attached to a component.

The embodiment shown in FIGS. 5 and 6 comprises a latching web as its latching means 24, which is produced by thermoforming the material of strip-like element 10 or by extrusion, or alternatively it can be simply attached. The latching web can also comprise other forms; for example, it can comprise lateral projections, or its end area can be designed in the shape of a Christmas tree.

Figure 8:
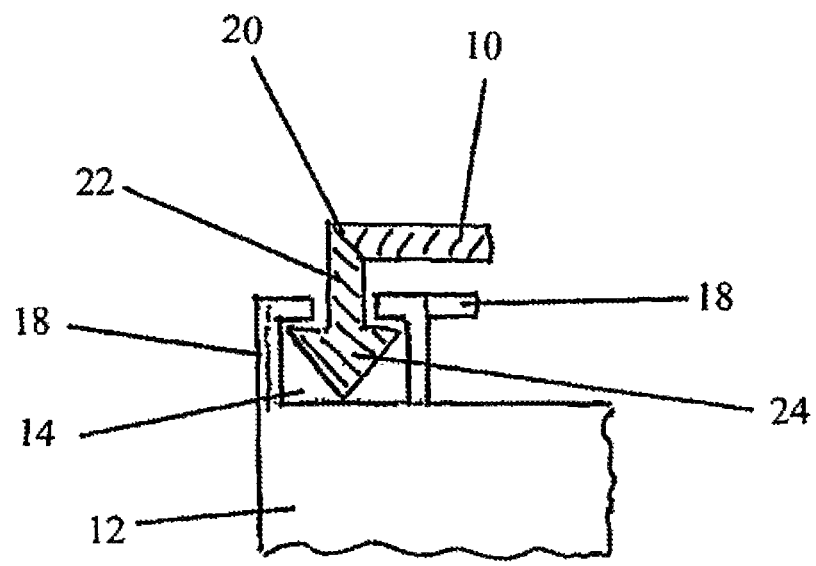
FIG. 8 is an enlarged schematic cross-sectional view of part of the fourth embodiment of the sealing tape after it has been attached to a component.

The form of latching means 24 shown in FIGS. 7 and 8 is that of an arrowhead, which is designed to be inserted sideways, i.e., longitudinally, into profile channels 14. If arrowhead-shaped latching means 24 is elastic enough, the latching means can also be introduced from above through opening 28 of profile channel 14 of component 12, the cross section of this opening being smaller than that of profile channel 14 in all of the embodiments.

Figure 10:
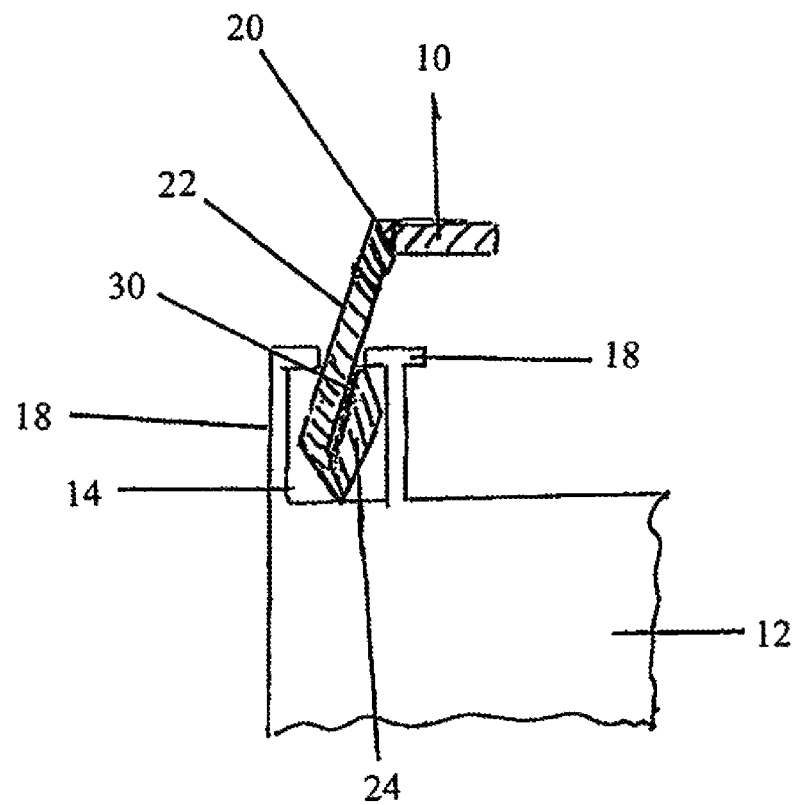
FIG. 10 is an enlarged schematic cross-sectional view of part of the fifth embodiment of the sealing tape after it has been attached to a component.

The embodiment shown in FIGS. 9 and 10 corresponds to the embodiment of FIGS. 3 and 4, wherein an adhesive layer 30 is arranged on the bottom surface of side section 22. The extension serving as latching means 24 can in this case be bent over toward the inside and held in place against the remaining portion of side section 22, as a result of which the strength of the clamping effect within profile channel 14 is again increased.

Figure 11:
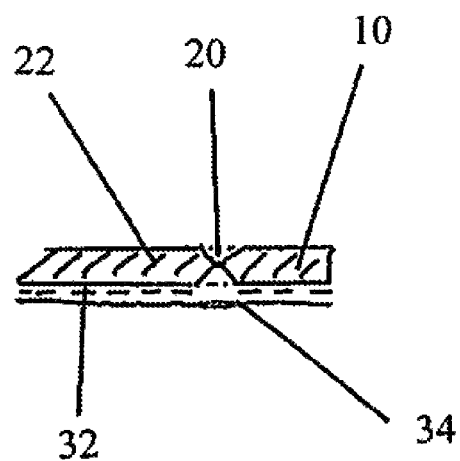
FIG. 11 is an enlarged schematic cross-sectional view of part of a sixth embodiment of the sealing tape according to the invention.
Figure 12:
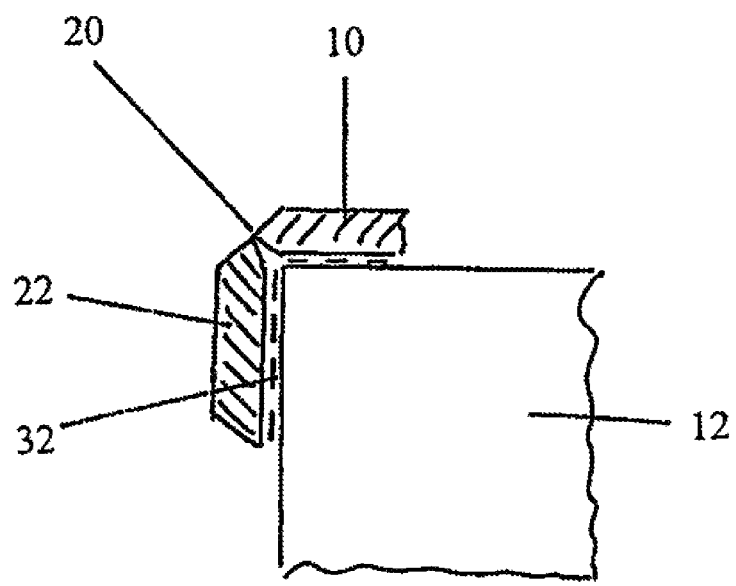
FIG. 12 is an enlarged schematic view of part of the sixth embodiment of the sealing tape after it has been attached to a component.

FIGS. 11 and 12 show a further embodiment of the sealing tape according to the invention. In this case, predetermined fold point 20 is preferably designed as a double-sided recess. Here, care must be taken to ensure that the remaining web of material is still thick enough to ensure a strong connection between side section 22 and the remaining portion of strip-like element 10 even after the element has been bent over. A pressure-sensitive adhesive layer 32 is preferably provided on the bottom surface of the edge area of the strip-like element 10, including side section 22; this adhesive layer is covered by a covering sheet 34. A sealing tape designed in this way is especially suitable for unprofiled components 12, such as wood window profiles. It is also possible here to provide additional mechanical means of attaching side sections 22 to component 12, such as staples.

In all of the embodiments cited above, the clamping type of attachment can be combined with adhesive bonding; that is, the surfaces of side sections 22 can also be designed with adhesive properties so that they can reinforce the clamping action by adhering to at least one flank of profile channel 14. It is also possible to introduce an adhesive into profile channel 14 first and then to introduce side section 22 into profile channel 14. A second, thinner foam strip, furthermore, can be attached from underneath to strip-like element 10 to fill at least partially the space which forms in the center area between strip-like element 10 and component 12.

The method for equipping a component with sealing tape according to the invention is extremely simple. In the beginning, strip-like element 10 including its side sections 22 is extending horizontally. If the material of strip-like element 10 is sufficiently flexible, the sealing tape can thus even be delivered wound up into a roll. After side sections 22 have been bent downward, they are inserted into profile channels 14 of component 12, where they clamp themselves in a dimensionally stable manner between profile strips 18, the tops of which are usually angled. The elastic force of the web in the area of predetermined fold point 20 leads to a wedging effect in profile channel 14 and thus to a permanent attachment.

As previously mentioned, the sealing tape according to the invention can in principle be produced either in the form of a strip or in the form of a roll. In the case of especially stiff materials of strip-like element 10, the strip form is the only possibility.

The sealing tape is usually attached to frame component 12 to be sealed before the component is installed or perhaps even before it is transported. After on-site installation in the desired opening in the building, the only additional step which may be necessary in certain cases is to open wrapper 4. When this is done, strip-like element 10 which is attached to frame component 12 (and which is usually not expandable) remains unchanged, whereas foam strip 2 expands outward and seals the joint.

It is also possible in particular for the sealing tape to be attached to a window frame profile just after the section has been fabricated, that is, even before the complete window frame has been assembled out of the individual sections.

Wrapper 4 shown in FIGS. 3, 4a, and 4b can be designed in a wide variety of different ways and can be attached at various points.

A tear-off tab 36 is preferably provided, which is formed by two sections of wrapper 4 which have been joined to each other. It is also possible to provide only a banner-like extension of wrapper 4. By pulling on tear-off tab 36, the sheet-like wrapper 4 is opened, and the foam strip 2 is free to expand. For this purpose, at least one predetermined tear site 38, preferably a perforation line, is provided in wrapper 4. The positions of predetermined tear sites 38 shown in FIGS. 3, 4a, and 4b are preferred, because in this case, after wrapper 4 has been opened, little or no material remains on foam strip 2. It is nevertheless also possible to imagine a number of other positions for predetermined tear-open sites 38.

If wrapper 4 is unable to withstand strong tensile forces, it is also possible to tear open wrapper 4 by pulling on the tear-off tab 36 even in the absence of a tear-open site 38. It is also possible to tear open wrapper 4 by pulling on a ripcord or to cut open the wrapper with a knife or some other means. Finally, entire wrapper 4 can be removed if the bond between the wrapper and foam strip 2 or strip-like element 10 can be separated by exerting tensile force on it.

In the example of FIGS. 3, 4a, and 4b, the wrapper covers two lateral surfaces 6 and top surface 8 of foam strip 2. In the area of bottom surface 9 of foam strip 2, a first section of wrapper 4 is arranged to cover part of bottom surface 9 of foam strip 2. A second section of wrapper 4, furthermore, is arranged between the first transverse surface 9 and strip-like element 10 in such as way as to cover a second part of the first transverse surface, i.e., bottom surface 9 of foam strip 2, namely, the part which is opposite the first part. The two sections of wrapper 4 therefore enclose the two bottom corners of foam strip 2, are folded over toward the inside, and are preferably attached there, preferably welded or laminated, to strip-like element 10. It is also possible, however, for the two wrapper sections to be attached to foam strip 2 by an adhesive or by lamination or welding. Bottom surface 9 of foam strip 2 located between the two sections of wrapper 4 remains uncovered. This is where double-sided adhesive tape 16 is fastened. Adhesive tape 16 can also extend over the two sections of wrapper 4.

Wrapper 4 can also extend between foam strip 2 and strip-like element 10 all the way across. In this case, it would be necessary, in addition to the first piece of double-sided tape 16, to provide a second piece of double-sided adhesive tape to fasten wrapper 4 to strip-like element 10.

Tear-off tab 36 can be formed on only one side of the sealing tape, as shown in FIGS. 3 and 4a. It is also possible to form two tear-off tabs 36, one on each side, as shown in FIG. 4b. In this advantageous case, an additional predetermined tear-open site 40, preferably again a perforation line, can be present in the top area of wrapper 4. When tear-off tabs 36 are pulled, this top tear-open site tears first and allows foam strip 2 to expand, after which, after further pulling on two tear-off tabs 36, predetermined tear-open sites 38 tear and thus allow wrapper 4 to be removed.

Many other embodiments of the present invention can be imagined. The details illustrated with reference to any one of FIGS. 1-12 can be also be used in any of the other embodiments.

In practice, foam strip 2 is usually precompressed in such a way that, when it expands, it will preferably become approximately 5 to 10 times thicker than it was in the precompressed state; in many cases, however, advantage is taken of only about half of this possible expansion capacity, because this ensures that reliable contact will be established with the building component lying opposite the frame element to be sealed.

A foam material which comprises greater flexural strength than foam strip 2, usually much greater flexural strength, is preferred as the material of strip-like element 10. Strip-like element 10 generally has a flexural strength of more than 200 kPa, and preferably of more than 250 kPa. In a preferred embodiment, the strip-like element has a flexural strength of more than 300 kPa, and preferably of more than 400 kPa. In an especially preferred embodiment, the strip-like element has a flexural strength of more than 500 kPa, preferably of more than 1,000 kPa, and even more preferably of more than 2,000 kPa. At the same time, the material of strip-like element 10 must be elastic enough that it will not break when it is bent at predetermined fold point 20 and also comprises the tendency to return to its original form. An upper limit for the flexural strength is therefore 10,000 kPa.

The material of foam strip 2, however, comprises a flexural strength of less than 150 kPa, preferably of less than 125 kPa, and even more preferably of less than 100 kPa, but in any case of more than 0 kPa.

The flexural strength of the material of strip-like element 10 and of foam strip 2 is determined on the basis of the standard ISO 1209-2, third edition, from the year 2007. This international standard is usually used to measure the flexural strength of plastics, but it is also highly suitable, in modified form, for measuring the flexural strength of foams.

According to this method, a uniformly increasing force is exerted vertically on the center of a test piece lying between two supports. The force causes the test piece to bend. The flexural strength is calculated on the basis of the measured force-versus-deformation curve (see Section 3 of ISO 1209-2). The test apparatus is shown in detail in FIG. 1 of Section 4. An example of the test apparatus used is model BZ2.5/TN1S from the Zwick Company in Ulm, Germany. A model KAP-Z load cell for forces up to 200 N is used for the measurements.

The supports consist of two parallel cylindrical support elements, which are arranged on the same horizontal plane, and each of which has a radius of 15±1 mm. The length of the support elements is greater than the width of the test pieces and in the present case is 80 mm.

For the present measurement, the distance L between the support elements is set at 85±2 mm and thus deviates from that prescribed by ISO 1209-2. The force transmission element has the same shape as the support elements. The other dimensions given in Section 5.1 of the ISO 1209-2 are also changed for the special purpose of measuring foam materials. Each measured foam test piece is a rectangular prism with a length l of 150±3 mm, a width b of 40±2 mm, and a thickness d of 3.0 ±0.2 mm. Of the various sets of test conditions described in Section 6 of ISO 1209-2, the first is used; that is, the measurement is carried out at 23±2° C. and 50±10% relative humidity. In contrast to the velocity at which the force transmission element is moved according to Section 7 of ISO 1209-2, a much slower downward velocity of only 10±1 mm per minute is used here. The force is measured up to a maximum deflection of the foam of 20 mm, and the maximum value $F_R$ of the force occurring during the course of the measurement is recorded.

The flexural strength R (in kPa) is calculated according to Section 8.1 of the ISO 1209-2 and thus by the use of the formula $R=1.5F_R*L/bd^2*10^6$, wherein FR is the maximum applied force in kN, L is the distance between the support elements in mm, b is the width of the test piece in mm, and d is the thickness of the test piece in mm.

At the previously specified values for L, b, and d, the measured forces $F_R$ for the material of the strip-like element 10 and of the foam strip 2 result in the values cited above.

The embodiments shown in FIGS. 3, 4a, and 4b are illustrated in a manner which idealizes the cross section of foam strip 2 to some extent. In reality, upper transverse surface 8 of foam strip 2 projects at least slightly upward to form a dome-like shape as a result of the pressure acting from within, so that the cross section of foam strip 2 in the precompressed state deviates from the shape of a rectangle to a certain extent but not severely so. Stiff element 10 is also observed in practice to show a certain transverse bending (outward bulging), especially in cases where the sealing tape is very wide.

The invention has been described above on the basis of the example of a foam strip 2 with a rectangular cross section, because this makes it much easier to explain the invention and its features. The term "rectangular" is also to be understood to include "square". The person skilled in the art will see that the invention can also be realized in a corresponding manner with foam strips 2 with cross sections which deviate from the rectangular. The cross-sectional shape of foam strip 2 shown here should therefore not be understood as limiting in any way.

Further, in the specification it has often been mentioned that the at least one side section 22 or two side sections 22 of strip-like element 10 is/are bent "downward". Whenever this term occurs, it should be understood that the at least one side section 22 or two side sections 22 can also be bent "upward", since this can be suitable in certain applications of the inventive sealing tape.

Reference throughout this specification to "one embodiment," "an embodiment," "a preferred embodiment" or similar language means that a particular feature, structure, or characteristic described in connection with the embodiment is included in at least one embodiment of the present invention. Thus, appearances of the phrases "in one embodiment," "in an embodiment," "in a preferred embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

While the present invention and its principles have been shown and described in connection with certain exemplary or specific embodiments, it is to be understood that the invention is not limited to the disclosed embodiments, but, on the contrary, is intended to cover various modifications, alternatives, modifications and equivalent arrangements as will be apparent to those skilled in the art. Any such changes, modifications, alternatives, modifications, equivalents and the like may be made without departing from the spirit and scope of the invention.

What is claimed is:

1. A method for equipping a frame profile with a sealing tape, comprising the steps of:
   providing the frame profile which has two profile channels open in an upward direction;
   providing the sealing tape comprising an elastically recoverable foam strip and a stiff strip-shaped element, the foam strip having a bottom surface and extending farther in a longitudinal direction than in a transverse direction, the stiff strip-shaped element being arranged in an area of the bottom surface of the foam strip, the stiff strip-shaped element comprises a first side section and a second side section, the first and second side sections forming opposite edge areas of the stiff strip-shaped element in the transverse direction, and the stiff strip-shaped element includes two predetermined fold points obtained by weakening a portion of the stiff strip-shaped element;
   bending the first side section and the second side section of the stiff strip-shaped element downward in opposite directions, the first side section bent in a clockwise direction and the second side section bent in a counter-clockwise direction, at the two predetermined fold points; and
   introducing the bent-over first and second side sections into the two profile channels where they clamp themselves in place.

2. The method according to claim 1 wherein the stiff strip-shaped element comprises a greater flexural strength than the foam strip.

3. The method according to claim 1 wherein the foam strip is firmly connected to the stiff strip-shaped element.

4. The method according to claim 1 wherein the stiff strip-shaped element is made of stiff foam.

5. The method according to claim 1 wherein the stiff strip-shaped element comprises a flexural strength of more than 200 kPa.

6. The method according to claim 1 wherein the stiff strip-shaped element comprises a flexural strength of more than 300 kPa.

7. The method according to claim 1 wherein the stiff strip-shaped element comprises a flexural strength of more than 500 kPa.

8. The method according to claim 1 wherein the stiff strip-shaped element comprises a flexural strength of more than 1,000 kPa.

9. The method according to claim 1 wherein the two predetermined fold points are formed by downward-facing recesses.

10. The method according to claim 9 wherein each of the two recesses is designed so that it becomes wider in a downward direction.

11. The method according to claim 1 wherein the first and second bendable side sections comprise a latching means at an edge section.

12. The method according to claim 1 wherein the first and second bendable side sections are designed to be self-adhesive.

13. The method according to claim 1 wherein the foam strip is enclosed at least partially by a sheet-type wrapping and is held in a precompressed state.

14. A method for forming a construction wall comprising a wall, an opening in the wall, a frame profile and a sealing tape, the method comprising the steps of:
provilding the frame profile which has two profile channels open in an upward direction;
providing the sealing tape comprising an elastically recoverable foam strip and a stiff strip-shaped element, wherein the foam strip has a bottom surface and extends farther in a longitudinal direction than in a transverse direction, the stiff strip-shaped element is arranged in an area of the bottom surface of the foam strip, the stiff strip-shaped element comprises a first side section and a second side section, the first and second side sections forming opposite edge areas of the stiff strip-shaped element in the transverse direction, and the stiff strip-shaped element includes two predetermined fold points obtained by weakening a material of the stiff strip-shaped element;
bending the first side section and the second side section of the stiff strip-shaped element downward in opposite directions, the first side section clockwise and the second side section counterclockwise, at the two predetermined fold points;
introducing the bent-over first and second side sections into the two profile channels where they clamp themselves in place; and
introducing the frame profile equipped with the sealing tape into the opening in the wall.

* * * * *